(12) United States Patent
Ziegler et al.

(10) Patent No.: US 9,464,666 B2
(45) Date of Patent: Oct. 11, 2016

(54) BUSHING AND TRANSMISSION ARRANGEMENT WITH THE BUSHING

(71) Applicant: Schaeffler Technologies GmbH & Co. KG, Herzogenaurach (DE)

(72) Inventors: Andreas Ziegler, Schwebheim (DE); Frank Beeck, Erlangen (DE); Frank Schoenstein, Baiersdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 130 days.

(21) Appl. No.: 14/244,308

(22) Filed: Apr. 3, 2014

(65) Prior Publication Data

US 2015/0260228 A1 Sep. 17, 2015

(30) Foreign Application Priority Data

Mar. 12, 2014 (DE) .................. 10 2014 204 571

(51) Int. Cl.
*F16C 33/10* (2006.01)
*F16C 21/00* (2006.01)
*F16C 33/08* (2006.01)

(52) U.S. Cl.
CPC ............. *F16C 21/005* (2013.01); *F16C 33/08* (2013.01); *F16C 33/1045* (2013.01)

(58) Field of Classification Search
CPC ...... F16C 17/02; F16C 21/00; F16C 21/005; F16C 33/04; F16C 33/08; F16C 33/10; F16C 33/1025; F16C 33/1045; F16C 33/106

USPC ....... 384/126, 127, 276, 286–290, 293, 294, 384/322
See application file for complete search history.

(56) References Cited

U.S. PATENT DOCUMENTS

| | | | | |
|---|---|---|---|---|
| 4,370,106 A | * | 1/1983 | Lauterbach | F16C 21/00 384/126 |
| 8,590,104 B2 | | 11/2013 | Ziegler et al. | |
| 8,708,567 B2 | * | 4/2014 | Lee | F16C 17/02 384/293 |
| 2014/0147068 A1 | * | 5/2014 | Dunlap | F16C 33/1055 384/397 |

FOREIGN PATENT DOCUMENTS

| | | | |
|---|---|---|---|
| DE | 3126892 | * | 1/1983 |
| DE | 102009052759 A1 | | 5/2011 |
| DE | 102009057098 A1 | | 6/2011 |
| DE | 102011006293 A1 | | 10/2012 |

* cited by examiner

*Primary Examiner* — James Pilkington
(74) *Attorney, Agent, or Firm* — Simpson & Simpson, PLLC

(57) ABSTRACT

A bushing for the force-fitting connection to a force-fitting partner, with a hollow-cylindrical basic body, with the basic body defining a primary axis, with the basic body comprising at least one coupling section with at least one radially extending penetrating opening for a fluidic communication with a fluid section in the force-fitting partner, and with the wall thickness in the coupling section being greater than the wall thickness in the neighboring section of the basic body abutting the coupling section with the basic body showing a track section, extending in the circumferential direction, for supporting a radial guidance of a bearing partner, and a transmission arrangement comprising the bushing.

10 Claims, 4 Drawing Sheets

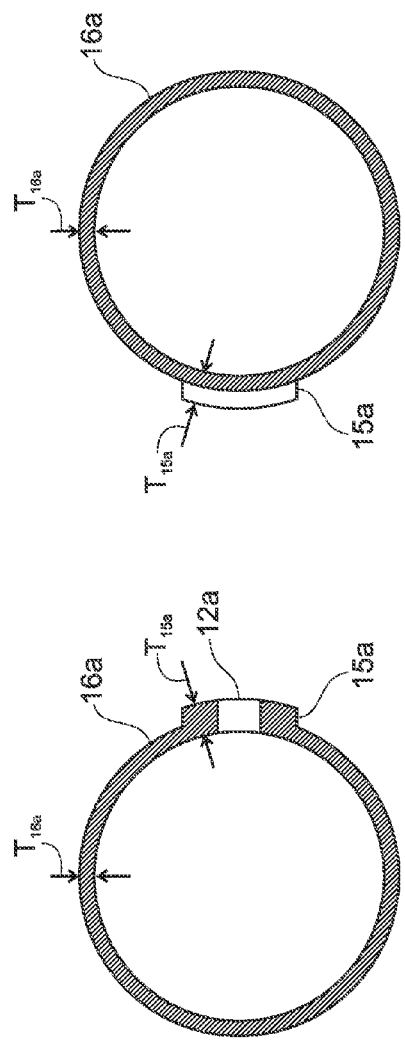
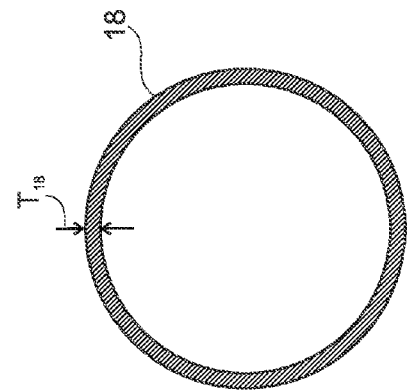
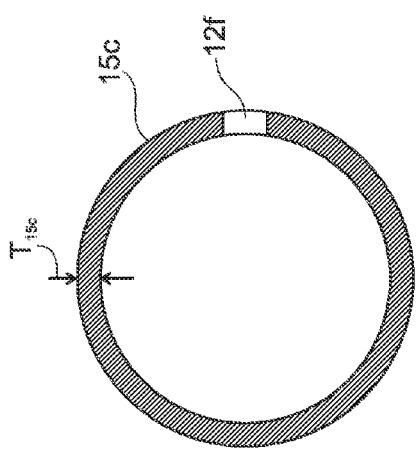
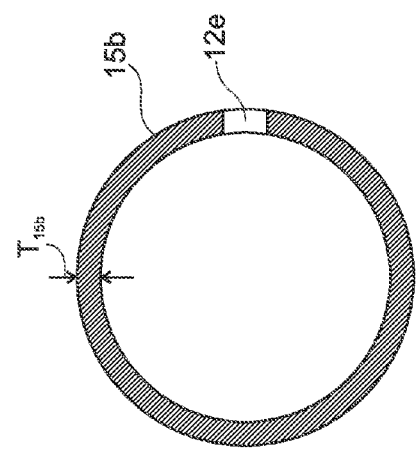

BUSHING AND TRANSMISSION ARRANGEMENT WITH THE BUSHING

CROSS-REFERENCE TO RELATED APPLICATIONS

This patent claims priority from German Patent Application No. 10 2014 204571.1 filed on Mar. 12, 2014, which application is incorporated herein by reference its entirety.

FIELD OF THE INVENTION

The invention relates to a bushing and to a transmission arrangement with this bushing.

BACKGROUND OF THE INVENTION

Bushings are frequently used in transmission technology in order to selectively reinforce areas or to create functional areas. Such bushings are impressed in many applications in order for them to be fixed in the surrounding construction so that they cannot get lost.

A multifunctional bushing is disclosed, for example, in the publication DE 10 2009 052759 A1. In this publication an interference fit assembly is described with a bushing-like part, which is fixed at a carrier in a force-fitting fashion, with at least one recess being embodied at the surface of the carrier, which is covered by at least one wall section of the bushing-like part, with the thickness of the sheet metal of the wall section at least partially covering the recess being thicker than the sheet metal of the bushing-like part directly abutting the wall section in at least one direction and forming with the bushing-like part the form-fitting connection to the carrier in the surroundings of the recess. The part comprises a plurality of radially extending holes, which end in the recess of the carrier, with the recess together with the penetrating opening forming a channel. In some embodiments a shaft may be seated in the bushing.

BRIEF SUMMARY OF THE INVENTION

The invention is based on the objective to expand the optional applications for such bushings. Preferred or advantageous embodiments of the invention are discernible from the claims, the following description, as well as the attached figures.

Within the scope of the invention a bushing is disclosed, which is embodied to form a force-fitting connection to a force-fitting partner. Here, the force-fitting connection preferably represents an interference fit assembly. A bushing is particularly embodied such that it can be pressed upon its force-fitting partner or pressed into the force-fitting partner. In particular, the bushing and the force-fitting partner form an interference fit assembly.

The bushing comprises a particularly straight, hollow-cylindrical basic body. Sections may abut the hollow-cylindrical body, particularly at the ends, such as flange sections or locking sections. The basic body defines with its axis of symmetry and/or rotary axis a primary axis, which is referenced in the following.

The basic body comprises at least one coupling section, with the coupling section forming a part of the wall of the basic body. At least one penetrating opening is inserted inside the coupling section, extending radially in reference to the primary axis. In other words, the basic body comprises at least one aperture in the coupling section. The penetrating opening serves for the fluidic communication with a fluid area in the force-fitting partner, particularly a lubricant area and/or refrigerant area. The bearing partner may also have fluid areas, with the fluid areas of the bearing partner being connected via the penetrating openings to the fluid areas of the force-fitting partner. The basic body may also have several such coupling sections, with each of them preferably including at least one penetrating opening. It may also be provided that one or more additional coupling sections are provided, which are not equipped with a penetrating opening.

The basic body is designed such that a wall thickness in the coupling section is larger than a wall thickness in a neighboring section of the basic body abutting said coupling section. Thus, the coupling section represents an area with a greater wall thickness and a neighboring section abutting thereto represents a section with a lower wall thickness. The coupling section and/or the neighboring section each form a section, particularly a surface section, in the basic body. It may be provided that the neighboring section surrounds the coupling section entirely and/or circumferentially. Alternatively it may be provided that two or more abutting neighboring sections are arranged at a coupling section. It may also be that the coupling section extends to an edge area of the basic body and is limited by one, two, or more neighboring sections.

As explained in the following, the coupling sections are arranged in parts of the basic body which are allocated to fluid areas and/or other recesses of the force-fitting partner. The background of this embodiment is that parts of the basic body, which in the radial direction are overlapping in reference to the primary axis, particularly arranged congruent in reference to the recesses and/or fluid areas of the force-fitting partners, would lead to out-of-roundness and/or local deformation of the hollow-cylindrical basic body, because in the area of the recesses it might yield in the direction of the recesses. In order to compensate this yielding, the coupling sections are provided with a greater wall thickness than the neighboring sections, with the neighboring sections being supported by the force-fitting connection, particularly by interference fit assemblies, on the force-fitting partner. Here, the wall thickness can be sized, based on the result, such that during the production of the force-fitting connection between the bushing and the force-fitting partner the hollow-cylindrical basic body assumes, at its free surface and/or at the surface facing away from the force-fitting partner, a straight cylindrical jacket form or approaches it to the extent possible.

The bushing is embodied for the radial guidance of the bearing partner. The bearing partner may therefore be arranged in the general embodiment of the invention inside the bushing. For example, a bearing partner may be embodied as an axis or a shaft. Or the bearing partner is arranged around a bushing, with the bearing partner being embodied as a stationary or also rotary surrounding construction or as a shaft seating, as a hollow shaft, or as a hollow axle.

It is suggested that the basic body and thus the bushing includes a track section extending about the primary axis, which is embodied for one bearing, particularly a friction bearing or a roller body bearing. In particular, the track section is realized as an annular cylinder jacket on the basic body.

By the embodiment according to the invention another function is integrated in the bushing, which provides that the bushing forms a radial support and/or bearing to guide the bearing partner. The radial bearing can particularly be embodied to guide a rotary motion and/or a pivotal motion. Alternatively, the track section forms only a radial support of the bearing partner here.

In a preferred further development of the invention the wall thickness of the track section is embodied equivalent to the wall thickness of the neighboring section. In particular, it may be provided that the track section forms part of or represents an axial extension of the neighboring section. For example, the coupling section can also form an annular cylinder jacket in the basic body, embodied like a hollow cylinder, with the track section being arranged axially offset in reference to the coupling section.

In a preferred further development of the invention the basic body comprises at least one, preferably several sealing sections, extending in the circumferential direction, particularly extending continuously over the circumferential direction. It is particularly preferred that the sealing sections are realized as additional annular cylinder jackets of the basic body. In preferred embodiments it is provided that the sealing sections overlap the coupling sections. The sealing effect is, however, ensured by the embodiment of the coupling sections having a greater wall thickness in order to compensate any deformations by the recesses in the force-fitting partner.

However, it is particularly preferred that the track section is arranged outside the coupling sections, because the track section requires a particularly high level of roundness. In particular, the track section is arranged here such that it can be supported on the force-fitting partner in a form-fitting fashion over its entire surface. While in the area of the sealing sections only low radial forces are transmitted, it must be expected in the track section that the radial stress is higher, with a strong support for the bearing being ensured by the embodiment of the track sections outside the coupling section or sections.

In a particular realization of the invention the track section is arranged at a free end of the basic body. In this embodiment particularly the coupling section or sections are positioned between the track section and the other end of the basic body. This way, the track section is arranged outside an area of the bushing, which due to the different wall thicknesses of the coupling section and the neighboring section requires complex processing. In fact, the track section is arranged at the end of the basic body, which has tapering only a uniform wall thickness so that this way the production is facilitated.

In a preferred realization of the invention a bushing is embodied as a formed part, particularly a metallic formed part. In this realization the bushing can be produced cost-effectively with constant low tolerance ranges. Additionally, a very low wall thickness can be achieved for the coupling sections, the neighboring sections, the track sections, and/or the sealing sections.

It is particularly preferred that the formed part is embodied as a drawn bushing, with the bushing having a flange end and a tension end. The flange end may be fixed during production with a press pad. The tension end is formed by deformation via material flow, starting with a sheet as a semi-finished part. It is provided that the track section is arranged at the tension end of the drawn bushing. This preferred embodiment has the background that folds may develop at the flange end, particularly when no press pad is used or a press pad of insufficient strength. Although there is the risk at the tension end that so-called bottom cracks develop, this can be controlled easier, so that the tension end represents a high degree of roundness of the drawn bushing and thus represents the better end for the track section.

Another object of the invention represents a transmission arrangement, which is particularly suited and/or embodied for a vehicle. In particular, the transmission arrangement serves for transmitting a driving torque and/or represents a component of a drive train. The transmission arrangement comprises at least one bushing, as described above. The bushing may have all of the above-described embodiments and situations of installation. Further, the transmission arrangement comprises the force-fitting partner, the bearing partner, with the bushing being connected via interference fit and thus via a force-fitting connection to the force-fitting partner. Further, the transmission arrangement has a roller bearing device, with the roller bearing device being arranged between the bearing partner and the bushing such that they are rotational or pivotal about a rotary axis in reference to each other or mutually support each other. In particular, the roller bodies of the roller bearing device, particularly rolls, roll or support themselves on the track section of the bushing. Particularly preferred, the roller bearing device is embodied as a single-row roller bearing device.

Further, the force-fitting partner has at least one fluid area, which is coupled in a fluidic fashion to at least one radially extending penetrating opening of the coupling section. In particular, the bushing is embodied as a sealing bushing. The fluid area may be embodied as a recess, particularly as a bore, which is congruent to the radially extending penetrating opening. However, it is more preferred that the fluid area is embodied as an extended recess in the force-fitting partner, which in its area is embodied larger than the allocated penetrating opening such that the remaining fluid area together with the bushing forms a fluid channel between the force-fitting partner and the bushing. In this embodiment the advantages of the invention show particularly strong effects, because the bushing is embodied on the one hand as a sealing bushing for generating at least one fluid channel and is embodied on the other hand as a carrier of the track section for the roller bearing device. This multi-functional part can be connected via the force-fitting connection to the force-fitting partner and this way it can be installed via a single production step.

It is particularly preferred that the bearing partner provides a counter track for the roller bearing device, with the counter track being formed by a base material of the bearing partner. In particular, the area between the roller bearing device and the bearing partner is embodied without bushings and/or the roller bodies of the roller bearing device roll directly on the bearing partner. By waiving another bushing, on the one hand the assembly expense can be reduced, and on the other hand the weight of the transmission arrangement as well. In order to guide the roller bearing arrangement, the counter track may be arranged in a groove.

In one possible embodiment of the invention the bearing partner is embodied as a shaft and the form-fitting partner as a rotational or pivotal hollow shaft or as a surrounding construction, particularly as a shaft seating. This way, the bearing partner can pivot or rotate in the bushing. Optionally, the force-fitting partner and the shaft can be rotated in reference to each other as well. In a particularly preferred embodiment of the invention the transmission arrangement is embodied as an automatic transmission, with the shaft being realized as a drive shaft and the shaft seating as a guide wheel section.

BRIEF DESCRIPTION OF THE DRAWINGS

Additional features, advantages, and effects of the invention are discernible from a preferred exemplary embodiment of the invention as well as the attached drawings, wherein.

DETAILED DESCRIPTION OF THE INVENTION

Figure 1:
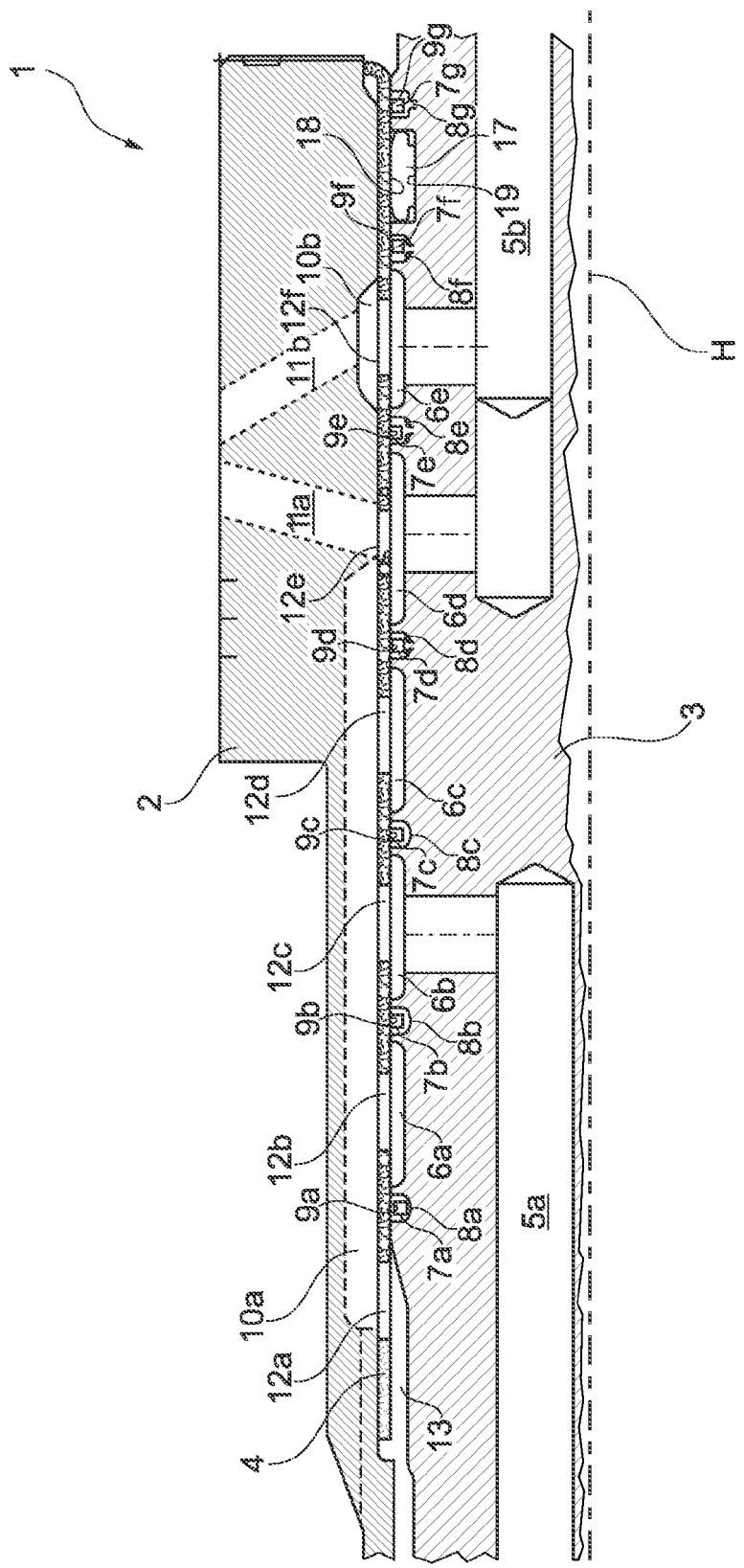
FIG. 1 shows a schematic cross-sectional view of a transmission arrangement as an exemplary embodiment of the invention.

FIG. 1 shows transmission arrangement 1 as an exemplary embodiment of the invention in a schematic cross-sectional view. Transmission arrangement 1 is embodied in this example as an automatic transmission with a converter section (not shown) for a vehicle, with, in the section shown, only guide wheel section 2 as well as drive shaft 3 being illustrated.

Guide wheel section 2 is arranged stationary in transmission arrangement 1. Drive shaft 3 also referred to as a bearing partner, is arranged rotating about primary axis H in reference to guide wheel section 2. Bushing 4 is impressed in guide wheel section 2, with bushing 4 and guide wheel section 2 being connected to each other in a force-fitting connection, namely, via an interference fit assembly or a force-fit, and with guide wheel section 2 forming a force-fitting partner for bushing 4. However, drive shaft 3 is embodied rotating in reference to guide wheel section 2 and bushing 4 such that drive shaft 3 forms a rotary partner for bushing 4.

Lubricant channels 5a, 5b are arranged in drive shaft 3, which extend in the axial direction towards primary axis H and which are opened in the radial direction towards guide wheel section 2. Channel sections 6a, 6b, 6c, 6d, 6e are arranged on drive shaft 3, which may be embodied circumferentially about primary axis H or which are embodied only sectionally in the circumferential direction. Lubricant channel 5a ends in channel section 6b, lubricant channel 5b ends in channel section 6d and in channel section 6e. Channel sections 6a, 6b, 6c, 6d, 6e and at least one additional section are limited in the axial direction by slip rings 7a, 7b, 7c, 7d, 7e, 7f, 7g, which are arranged in circumferential grooves 8a, 8b, 8c, 8d, 8e, 8f, 8g of drive shaft 3. Slip rings 7a-g are formed from plastic, particularly an inherently stable plastic, so that they contact bushing 4 like piston rings. Bushing 4 provides sealing sections 9a, 9b, 9c, 9d, 9e, 9f, 9g as contacting areas at its inside in the form of circumferential cylinder jacket sections.

Guide wheel section 2 includes recesses 10a, 10b as well as lubricant channels 11a, 11b, each of which being formed as fluid areas for a lubricant. Recess 10a extends in the axial direction over channel sections 6a, 6b, 6c and partially 6d. Recess 10b is aligned congruent in reference to recess 6e. Recess 10a is embodied limited in the circumferential direction. Recesses 10a, 10b each extend, for example,. over an angular range of less than 40 degrees, preferably, less than 30 degrees. Bushing 4 partially covers recess 10a, 10b so that by bushing 4 and guide wheel section 2, particularly recess 10a, a lubricant channel structure is formed.

Bushing 4 comprises penetrating openings 12a, 12b, 12c, 12d, 12e, 12f, with the fluid area of recess 10a being able to communicate with annular chamber 13 about drive shaft 3 via penetrating opening 12a. Further, recesses 6a, 6b, 6c can communicate via penetrating openings 12b, 12c, 12d with fluid area 10a such that a distribution structure is formed for the lubricant. Recess 6d communicates, however, via penetrating opening 12e with lubricant channel 11a, recess 6e communicates via penetrating opening 12f and recess 10b with lubricant channel 11b.

The lubricant guiding and distribution structures shown shall be understood as mere examples; depending on the strategy for lubricant distribution, by the cooperation of recesses 6a-e, 10a, 10b with lubricant channels 5a, 5b, 11a, 11b via penetrating openings 12af, arbitrary strategies can be implemented.

Bushing 4 may enter into a force-fitting connection with guide wheel section 2 only in the areas of guide wheel section 2, at which no recesses 10a, 10b or lubricant channels 11a, 11b are provided. Without any additional measures this would lead, however, to the sections of bushing 4, supported by guide wheel section 2 and not supported by recesses 10a, 10b and/or lubricant channels 11a, 11b, being able to assume a different radial position. By the different radial offset of these sections of bushing 4 out-of-roundness and thus a lack of smooth operation of drive shaft 3 would develop in bushing 4. For this reason, bushing 4 comprises sections with different wall thicknesses, as explained in the context of FIG. 2.

Figure 2:
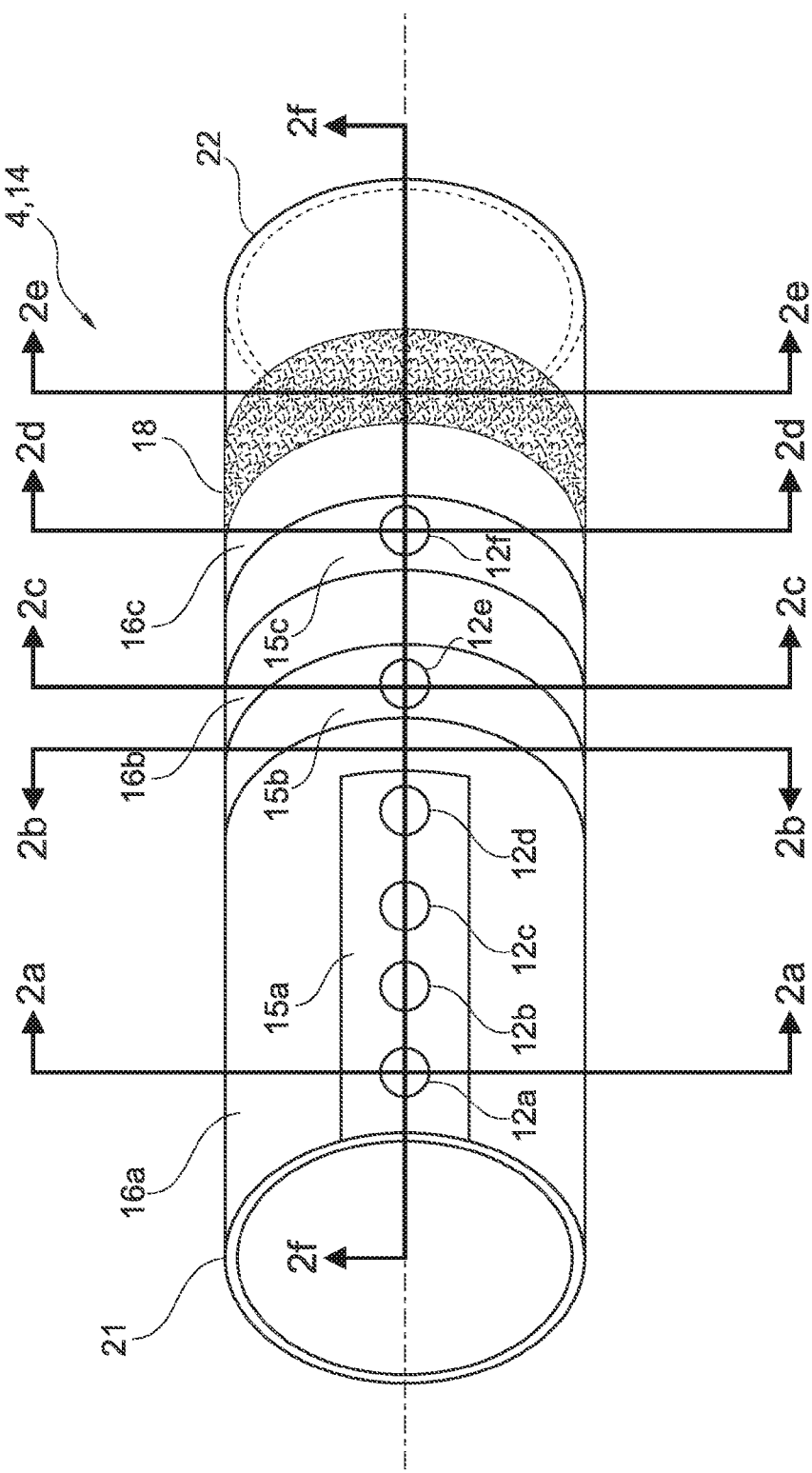
FIG. 2 shows, in a schematic three-dimensional illustration, a bushing of the transmission arrangement in FIG 1.

FIG. 2 shows bushing 4 in a largely schematic illustration in order to explain the different areas. Bushing 4 comprises as basic body 14 a hollow-cylindrical, particularly a straight hollow-cylindrical form. Penetrating openings 12a-f are schematically indicated. Penetrating openings 12a-f communicate with recesses 10a, 10b and/or lubricant channels 11a, 11b. Recesses 10a, 10b include an area extension, which is not only limited to penetrating openings 12a-d but which are embodied in a wider extension. Guide wheel section 2 features one additional circumferential recess (not shown) at each of the lubricant channels 11a, 11b.

Corresponding, particularly overlapping, in particular congruent to recesses 10a, 10b and/or to the other recesses about lubricant channels 11a, 11b, bushing 4 has coupling sections 15a, 15b, 15c, which are equivalent in the form of their extension to recesses 10a, 10b and/or the other recesses. This way, recess 10a is formed by an area section extending in the axial direction and limited in the circumferential direction. Coupling section 15a extends in the same way in the axial direction and is limited in the circumferential direction about primary axis H.

Neighboring section 16a abuts at coupling section 15a, which is formed in this example by basic body 14 of bushing 4 without coupling section 15a. The wall thickness (or wall strength) of coupling section 15a is embodied greater than the wall thickness of neighboring section 16a so that the yielding of bushing 4 in the area of recess 10a is compensated by thicker material and this way a constant internal diameter of bushing 4 is achieved in the installed state in FIG. 1. In particular, a very high degree of roundness is achieved in the area of sealing sections 9a, 9b, 9c, 9d for sealing rings 9a, 9b, 9c, 9d.

Coupling section 15b extends in the form of a ring circumferential about primary axis of rotation H, with penetrating opening 12e being arranged in coupling section 15b. Here, the planar extension of coupling section 15b at the planar extension of the additional recess, allocated to penetrating opening 12e, is compensated. In the axial direction, next to coupling section 15b, on the one hand neighboring section 16a is arranged and on the other hand neighboring section 16b. Here it also applies that the wall thickness of a coupling section 15b is slightly greater than the wall thickness of neighboring sections 16a, 16b, in order to ensure sufficient roundness in the installed, particularly impressed situation.

In the same fashion, coupling section 15c is formed, which also has an annular form, and which is limited axially by neighboring sections 16b and 16c at the sides.

Although by the reinforcement of the wall thicknesses in coupling sections 15a, 15b, 15c a high degree of roundness is achieved, similar to the exemplary embodiment in FIG. 1, an additional support of drive shaft 3 at guide wheel section 2 may be beneficial. For this purpose, transmission arrangement 1 comprises roller bearing device 17, which is embodied as a roller bearing, particularly, a radial roller bearing.

Bushing 4 provides circumferential track section 18 at its interior for roller bearing device 17. At the interior circumference roller bearing device 17 rolls along counter track 19, which is formed by the basic material of drive shaft 3. In particular, roller bearing device 19 is arranged in circumferential groove 20 or a recess of drive shaft 3.

FIG. 2 shows track section 18 as a black streak with a constant axial width. The position for track section 18 is selected such that all coupling sections 15a, 15b, 15c are located on one axial side of track section 18. This way, track section 18 is arranged at one end of bushing 4 and coupling sections 15a, 15b, 15c, particularly all coupling sections 15a, 15b, 15c, are positioned on the other axial side.

Bushing 4 is formed as a drawn bushing made from metal, with regard to manufacturing. This way, during the production, starting with a planar sheet, particularly a rhomb, a socket is drawn with a socket bottom. This way, the socket and also the resulting bushing 4 have flange end 21 and tension end 22, with tension end 22 marking the end of the socket with the socket bottom and flange end 21 marking the end with the flange. For example, flange end 21 may be held down by a press pad. In the resulting bushing 4 both the flange as well as the socket bottom have been removed.

Track section 18 is arranged at tension end 22 because this end has a higher quality with regard to roundness. While at flange end 21 the processing window is limited by the generation of folds due to the lack of press pads or insufficiently strong ones, and thus in the edge region of the process window folds and thus out-of-roundness areas develop, tension end 22 is threatened by bottom tears, namely at the edge of the process window, however if such bottom tears do not arise, which can be ensured by simple monitoring, the degree of roundness is very high so that the support of driven shaft 3 is better implemented via roller bearing device 17 at tension end 22 than at flange end 21.

FIGS. 2a and 2b show wall thickness $T_{15a}$ of coupling section 15a greater than wall thickness $T_{16a}$ of neighboring section 16a taken along lines 2a-2a and 2b-2b in FIG. 2.

FIG. 2c shows wall thickness $T_{15b}$ of coupling section 15b taken along line 2c-2c in FIG. 2.

FIG. 2d shows wall thickness $T_{15c}$ of coupling section 15c taken along line 2d-2d in FIG. 2.

FIG. 2e shows wall thickness $T_{18}$ of track section 18 taken along line 2e-2e in FIG. 2.

Figure 2F:
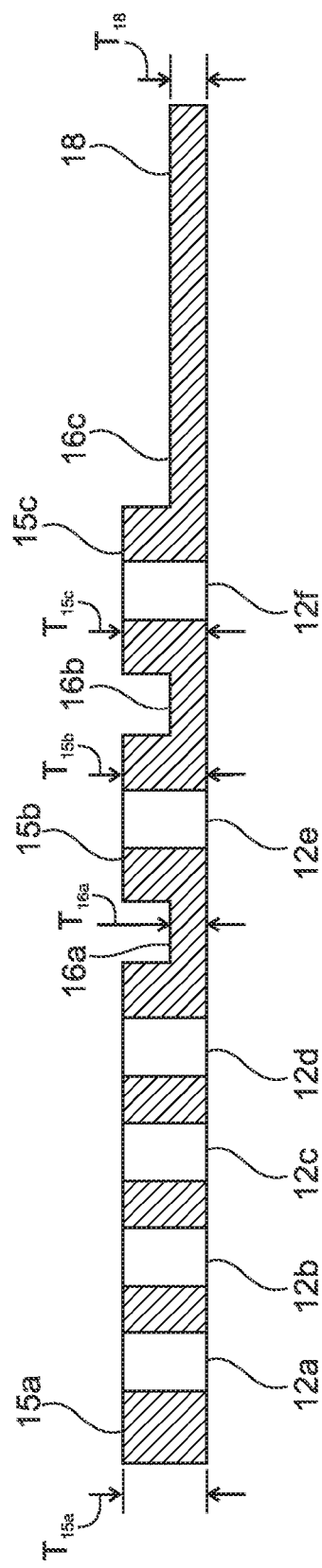
FIG. 2a shows a schematic cross-sectional view of the bushing taken generally along line 2a-2a in FIG. 2.
FIG. 2b shows a schematic cross-sectional view of the bushing taken generally along line 2b-2b in FIG. 2.
FIG. 2c shows a schematic cross-sectional view of the bushing taken generally along line 2c-2c in FIG. 2.
FIG. 2d shows a schematic cross-sectional view of the bushing taken generally along line 2d-2d in FIG. 2.
FIG. 2e shows a schematic cross-sectional view of the bushing taken generally along line 2e-2e in FIG. 2; and, FIG. 2f shows a schematic cross-sectional view of the bushing taken generally along line 2f-2f in FIG. 2.

FIG. 2f shows the relative wall thicknesses of coupling section 15a, neighboring section 16a, coupling section 15b, neighboring section 16b, coupling section 15c, neighboring section 16c and track section 18.

The bushing for a force-fitting connection to a force-fitting partner includes a hollow-cylindrical basic body defining a primary axis. The hollow-cylindrical basic body includes: at least one coupling section 15a, 15b, 15c, having at least one radially extending penetrating opening for a fluidic communication with a fluid section in the force-fitting partner, the at least one coupling section having a first wall thickness $T_{15a}$, $T_{15b}$, $T_{15c}$; a neighboring section 16a, 16b, 16c, abutting the at least one coupling section, the neighboring section having a second wall thickness $T_{16a}$; and, a track section 18 for a bearing extending in a circumferential direction for a radial guidance of a bearing partner 3, the track section having a third wall thickness $T_{18}$. The first wall thickness $T_{15a}$, $T_{15b}$, $T_{15c}$ is larger than the second wall thickness $T_{16a}$ and the third wall thickness $T_{18}$ and the third wall thickness $T_{18}$ is equivalent to the second wall thickness $T_{16a}$.

LIST OF REFERENCE NUMBERS

1 Transmission arrangement
2 Guide wheel section
3 Drive shaft
4 Bushing
5 Lubricant channel
6 a-e Channel sections
7 a-g Slip rings
8 a-g Grooves
9 a-g Sealing sections
10 a,b Recess
11 a,b Lubricant channel
12 a-f Penetrating opening
13 Annular chamber
14 Basic body
15 a,b,c Coupling section
16 a,b,c Neighboring section
17 Roller bearing device
18 Track section
19 Counter track
20 Groove
21 Flange end
22 Tension end
H Primary axis
$T_{15a}$ Wall thickness
$T_{15b}$ Wall thickness
$T_{15c}$ Wall thickness
$T_{16a}$ Wall thickness
$T_{18}$ Wall thickness

What is claimed is:

1. A bushing for a force-fitting connection to a force-fitting partner, the bushing comprising:
    a hollow-cylindrical basic body defining a primary axis, the hollow-cylindrical basic body comprising:
        at least one coupling section having at least one radially extending penetrating opening for a fluidic communication with a fluid section in the force-fitting partner, the at least one coupling section having a first wall thickness;
        a neighboring section abutting said at least one coupling section, the neighboring section having a second wall thickness; and,
        a track section for a bearing extending in a circumferential direction for a radial guidance of a bearing partner, the track section having a third wall thickness; wherein:
    the first wall thickness is larger than the second wall thickness and the third wall thickness; and, the third wall thickness is equivalent to the second wall thickness.

2. The bushing recited in claim 1, wherein the hollow-cylindrical basic body comprises at least one sealing section extending in the circumferential direction.

3. The bushing recited in claim 1, wherein the track section is arranged at a free end of the hollow-cylindrical basic body.

4. The bushing recited in claim 1, wherein the bushing is embodied as a drawn sheath.

5. The bushing recited in claim 4, wherein the drawn sheath is embodied as a drawn sheath with a flange end and a tension end, with the track section being arranged at the tension end.

6. A transmission arrangement for a vehicle, comprising:
   a bushing arranged for a force-fitting connection to a force-fitting partner, the bushing comprising:
      a hollow-cylindrical basic body defining a primary axis, the hollow-cylindrical basic body comprising:
         at least one coupling section having at least one radially extending penetrating opening for a fluidic communication with a fluid section in the force-fitting partner; and,
         a track section for a bearing extending in a circumferential direction for a radial guidance of a bearing partner; wherein:
         a first wall thickness in the coupling section is larger than a second wall thickness in a neighboring section of the hollow-cylindrical basic body abutting the at least one coupling section;
   wherein the bearing is arranged between the bearing partner and the bushing, such that they are rotational in reference to each other about the primary axis; and,
   wherein the bushing is connected via a press fit to the force-fitting partner.

7. The transmission arrangement recited in claim 6, wherein the bearing partner provides a counter track for the roller bearing device, with the counter track being formed in the bearing partner.

8. The transmission arrangement recited in claim 6, wherein the bearing partner is embodied as a shaft and the force-fitting partner as a shaft support.

9. The transmission arrangement recited in claim 8, wherein the shaft is embodied as a drive shaft and the shaft support is formed as a guide wheel section.

10. A bushing for a force-fitting connection to a force-fitting partner, said bushing comprising:
   a hollow-cylindrical basic body defining a primary axis, said hollow-cylindrical basic body comprising:
      at least one coupling section extending axially along the primary axis and limited in a circumferential direction about the primary axis, the at least one coupling section comprising:
         a first wall thickness; and,
         a radially extending penetrating opening arranged for a fluidic communication with a fluid section in said force-fitting partner;
      a neighboring section abutting said at least one coupling section, said neighboring section having a second wall thickness where said second wall thickness is smaller than said first wall thickness; and,
      a track section for a bearing extending in the circumferential direction for radially guiding a bearing partner.

\* \* \* \* \*